(12) United States Patent
Chen et al.

(10) Patent No.: US 11,120,275 B2
(45) Date of Patent: Sep. 14, 2021

(54) VISUAL PERCEPTION METHOD, APPARATUS, DEVICE, AND MEDIUM BASED ON AN AUTONOMOUS VEHICLE

(71) Applicant: Baidu Online Network Technology (Beijing) Co., Ltd., Beijing (CN)

(72) Inventors: Jiajia Chen, Beijing (CN); Ji Wan, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 123 days.

(21) Appl. No.: 16/516,017

(22) Filed: Jul. 18, 2019

(65) Prior Publication Data
US 2020/0005051 A1    Jan. 2, 2020

(30) Foreign Application Priority Data

Sep. 11, 2018   (CN) .......................... 201811055289.1

(51) Int. Cl.
*G06K 9/00* (2006.01)
*B60Q 9/00* (2006.01)
*G06N 3/08* (2006.01)

(52) U.S. Cl.
CPC ......... *G06K 9/00791* (2013.01); *B60Q 9/005* (2013.01); *G06N 3/08* (2013.01)

(58) Field of Classification Search
None
See application file for complete search history.

(56) References Cited

U.S. PATENT DOCUMENTS

2018/0157916 A1    6/2018   Doumbouya et al.
2018/0157934 A1    6/2018   Hu et al.
(Continued)

FOREIGN PATENT DOCUMENTS

CN    105809704 A    7/2016
CN    107885214 A    4/2018
(Continued)

OTHER PUBLICATIONS

CNBLUSP201904519—The First Office Action of Parallel JP application; 2 pages.
(Continued)

*Primary Examiner* — Leon Flores
(74) *Attorney, Agent, or Firm* — Peame & Gordon LLP (57) ABSTRACT

The present disclosure provides a visual perception method, an apparatus, a device and a medium based on an autonomous vehicle, the method includes inputting an obtained first visual perception image collected by the autonomous vehicle into a first neural network model, recognizing multi-channel feature information of at least one target recognition object to be recognized, to eliminate redundant feature information in the first visual perception image; further, inputting the multi-channel feature information of the at least one target recognition object to be recognized into at least one sub-neural network model in a second neural network model respectively, to obtain at least one target recognition object; where there is a one to one correspondence between the target recognition object and the sub-neural network model. The present disclosure improves the speed of recognizing the target recognition object, thereby improving sensitivity of the autonomous vehicle and ensuring driving safety of the autonomous vehicle.

15 Claims, 3 Drawing Sheets

(56) References Cited

U.S. PATENT DOCUMENTS

| | | | |
|---|---|---|---|
| 2018/0174046 A1 | 6/2018 | Xiao et al. | |
| 2019/0095212 A1* | 3/2019 | Yang | G06K 9/6267 |
| 2019/0171912 A1* | 6/2019 | Vallespi-Gonzalez | |
| | | | G06K 9/4642 |

FOREIGN PATENT DOCUMENTS

| | | |
|---|---|---|
| CN | 108154196 A | 6/2018 |
| CN | 108230358 A | 6/2018 |
| CN | 108230421 A | 6/2018 |
| CN | 108241829 A | 7/2018 |
| CN | 108319977 A | 7/2018 |
| CN | 108510012 A | 9/2018 |

OTHER PUBLICATIONS

Dai, Jifeng et al., R-FCN: Object Detection via Region-based Fully Convolutional Networks; 12 pages.
European Search Report regarding Application No. 19187106.0-1207 / 3579144 dated Mar. 2, 2020; 11 pages.
Dai et al.; R-FCN: Object Detection via Region-based Fully Convolutional Networks; 11 pages.
Ren et al; Faster R-CNN; Towards Real-Time Object Detection with Region Proposal Networks; 14 pages.
First Office Action of the priority application No. 201811055289.1 dated Mar. 19, 2020; 11 pages.
Third Office Action of the priority application No. 201811055289.1; dated Aug. 25, 2020; 10 pages.
Teichmann et al., MultiNet: Real-time Joint Semantic Reasoning for Autonomous Driving; Department of Computer Science, University of Toronto; 10 pages.

\* cited by examiner

VISUAL PERCEPTION METHOD, APPARATUS, DEVICE, AND MEDIUM BASED ON AN AUTONOMOUS VEHICLE

CROSS-REFERENCE TO RELATED APPLICATIONS

This application claims priority to Chinese Patent Application No. 201811055289.1, filed on Sep. 11, 2018 and entitled "Visual Perception Method, Apparatus, Device, and Medium Based on an Autonomous Vehicle," which is hereby incorporated by reference in its entirety.

FIELD OF THE TECHNOLOGY

The present disclosure relates to automatic driving technologies and, in particular, to a visual perception method, an apparatus, a device, and a medium based on an autonomous vehicle.

BACKGROUND

With the development of information technology, autonomous vehicle as become the main research direction of intelligent vehicle research. During the operation of an autonomous vehicle, the autonomous vehicle needs real-time visual perception processing to control the operation of the autonomous vehicle based on visual perception results.

In the prior art, the autonomous vehicle may collect visual perception images, and then the autonomous vehicle recognizes different target objects (such as an obstacle, a lane line or a traffic sign, etc.) in the collected visual perception images; during the recognition, the visual perceptual images need to be inputted into a deep learning model corresponding to different target objects for feature extraction and recognition, thereby determining the corresponding target objects.

Because in the prior art, the visual perceptual images need to be inputted into the deep learning model corresponding to different target objects for feature extraction and recognition, so that there is a large delay in separately recognizing different target objects, and a slower speed of recognizing the target objects, therefore, sensitivity of the autonomous vehicle is reduced, which easily leads to traffic accidents.

SUMMARY

The present disclosure provides a visual perception method, an apparatus, a device and a medium based on an autonomous vehicle, which solve the technical problem that due to the slower speed of recognizing the target objects in the prior art, sensitivity of the autonomous vehicle is reduced, which easily leads to traffic accidents.

In a first aspect, the present disclosure provides a visual perception method based on an autonomous vehicle, including:

obtaining a first visual perception image collected by the autonomous vehicle;

inputting the first visual perception image into a first neural network model, and recognizing multi-channel feature information of at least one target recognition object to be recognized, to eliminate redundant feature information in the first visual perception image; and inputting the multi-channel feature information of the at least one target recognition object to be recognized into at least one sub-neural network model in a second neural network model respectively, to obtain the at least one target recognition object; wherein there is a one to one correspondence between the target recognition object and the sub-neural network model.

In a possible embodiment, the method further includes:
obtaining the first neural network model.

In a possible embodiment, the obtaining the first neural network model includes:
training a first preset neural network model according to a second visual perception image and multi-channel feature information of at least one training sample object, to generate the first neural network model; wherein the second visual perception image comprises the at least one training sample object.

In a possible embodiment, the method further includes:
obtaining the second neural network model.

In a possible embodiment, the obtaining the second neural network model includes:
training at least one sub-preset neural network model in a second preset neural network model according to at least one training sample object and multi-channel feature information of the at least one training sample object, to generate the second neural network model; wherein there is a one to one correspondence between the training sample object and the sub-preset neural network model.

In a possible embodiment, the obtaining the first visual perception image collected by the autonomous vehicle includes:
obtaining the first visual perception image collected by an image collection apparatus in the autonomous vehicle.

In a possible embodiment, the target recognition object includes at least one of the followings: a target substance and target semantics.

In a second aspect, the present disclosure provides a visual perception apparatus based on an autonomous vehicle, including:

a first obtaining module, configured to obtain a first visual perception image collected by the autonomous vehicle;

an recognizing module, configured to input the first visual perception image into a first neural network model, and recognize multi-channel feature information of at least one target recognition object to be recognized, to eliminate redundant feature information in the first visual perception image; and a determining module, configured to input the multi-channel feature information of the at least one target recognition object to be recognized into at least one sub-neural network model in a second neural network model respectively, to obtain at least one target recognition object; wherein there is a one to one correspondence between the target recognition object and the sub-neural network model.

In a possible embodiment, the apparatus further includes:
a second obtaining module, configured to obtain the first neural network model.

In a possible embodiment, the second obtaining module is specifically configured to:
train a first preset neural network model according to a second visual perception image and multi-channel feature information of at least one training sample object, to generate the first neural network model; wherein the second visual perception image comprises the at least one training sample object.

In a possible embodiment, the apparatus further includes:
a third obtaining module, configured to obtain the second neural network model.

In a possible embodiment, the third obtaining module is specifically configured to:

train at least one sub-preset neural network model in a second preset neural network model according to at least one training sample object and multi-channel feature information of the at least one training sample object, to generate the second neural network model; wherein there is a one to one correspondence between the training sample object and the sub-preset neural network model.

In a possible embodiment, the first obtaining module is specifically configured to:

obtain the first visual perception image collected by an image collection apparatus in the autonomous vehicle.

In a possible embodiment, the target recognition object includes at least one of the followings: a target substance and target semantics.

In a third aspect, the disclosure provides a control device, including a memory and a processor;

the memory is configured to store a computer instruction;

the processor is configured to run the computer instruction stored in the memory to implement the visual perception method based on the autonomous vehicle according to any embodiments of the first aspect above.

In a fourth aspect, the present disclosure provides a storage medium, including a readable storage medium and a computer instruction, the computer instruction is stored in the readable storage medium; the computer instruction is configured to implement the visual perception method based on the autonomous vehicle according to any embodiments of the first aspect above.

The visual perception methods, apparatuses, devices and mediums based on the autonomous vehicle according to embodiments of the present disclosure are performed by inputting an obtained first visual perception image collected by the autonomous vehicle into a first neural network model, and recognizing multi-channel feature information of at least one target recognition object to be recognized to eliminate redundant feature information in the first visual perception image; further, inputting the multi-channel feature information of the at least one target recognition object to be recognized into at least one sub-neural network model in a second neural network model respectively to obtain at least one target recognition object: where there is a one to one correspondence between the target recognition object and the sub-neural network model. In embodiments of the present disclosure, the redundant feature information in the first visual perception image being eliminated by the first neural network model, and only the multi-channel feature information of the at least one target recognition object to be recognized being input into at least one sub-neural network model in the second neural network model for recognition, which may reduce the time for each sub-neural network model to eliminate redundant feature information, and improve speed of recognizing the target recognition object, thereby improving sensitivity of the autonomous vehicle and ensuring driving safety of the autonomous vehicle.

BRIEF DESCRIPTION OF THE DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate some embodiments of the present disclosure, and those skilled in the art may still derive other drawings from the accompanying drawings without any creative effort.

DETAILED DESCRIPTION

First, disclosure scenes and some related vocabularies in embodiments of the present disclosure are explained.

The visual sensing methods, apparatuses, devices and mediums based on the autonomous vehicle provided in the embodiments of the present disclosure may be used on the autonomous vehicle for visual perception, so as to facilitate to control the autonomous vehicle in disclosure scenes. The speed of recognizing a target recognition object is increased by embodiments of the present disclosure, thereby improving the sensitivity of the autonomous vehicle and ensuring the driving safety of the autonomous vehicle.

The executive subject for the visual perception methods based on the autonomous vehicle provided in the embodiments of the present disclosure may be a visual perception apparatus or a control device based on the autonomous vehicle (for ease of description, e.g. using the visual perception apparatus as the executive subject to illustrate the embodiments). Illustratively, the apparatus may be implemented through software and/or hardware.

A target recognition object involved in embodiments of the present disclosure may include, but not limited to, a target substance and/or target semantics. Illustratively, the target substance may include, but not limited to, at least one of the followings: an obstacle, a lane line, and a traffic sign. Illustratively, the target semantics may include, but not limited to, at least one of the followings: a tree area, a driving area, and a fence area.

A training sample object involved in embodiments of the present disclosure may include, but not limited to, a substance sample and/or a semantic sample. Illustratively, the substance sample may include, but not limited to, at least one of the followings: an obstacle, a lane line, and a traffic sign. Illustratively, the semantic sample may include, but not limited to, at least one of the followings: a tree area, a driving area, and a fence area.

A first neural network model involved in embodiments of the present disclosure refers to a neural network model obtained by training a first preset neural network model. Illustratively, the first neural network model is configured to extract multi-channel feature information of at least one target recognition object to be recognized in a first visual perception image, to eliminate redundant feature information in the first visual perception image (referring to feature information that does not need to be recognized). For example, the redundant feature information may include, but not limited to, feature information of a non-target recognition object that does not need to be recognized and/or feature information of the target recognition object that does not need to be recognized.

A second neural network model involved in embodiments of the present disclosure refers to a neural network model obtained by training at least one sub-preset neural network model in a second preset neural network model; where each sub-preset neural network model corresponds to a class of training sample object. Illustratively, the second neural network model includes at least one sub-neural network model in parallel, and each sub-neural network model corresponds to a class of target recognition object.

Illustratively, any one of sub-neural network models in the second neural network model is configured to recognize multi-channel feature information of a corresponding target recognition object to obtain the target recognition object.

The visual perception methods, apparatuses, devices and mediums based on the autonomous vehicle provided in the embodiments of the present disclosure are performed by eliminating redundant feature information in a first visual perception image through a first neural network model and only inputting multi-channel feature information of at least one target recognition object to be recognized into at least one sub-neural network model in a second neural network model respectively for recognition, which may reduce the time for each sub-neural network model to eliminate the redundant feature information, therefore, the technical problems such as the slower speed of recognizing the target objects in the prior art, the reduced sensitivity of the autonomous vehicle, which easily leads to traffic accidents, all can be solved.

The technical solutions of the present disclosure and how the above technical problems of the present disclosure are solved by the technical solutions are hereinafter described in detail with reference to specific embodiments. The following specific embodiments may be combined with each other, and the same or similar concepts or processes may not be described in some embodiments.

Figure 1:
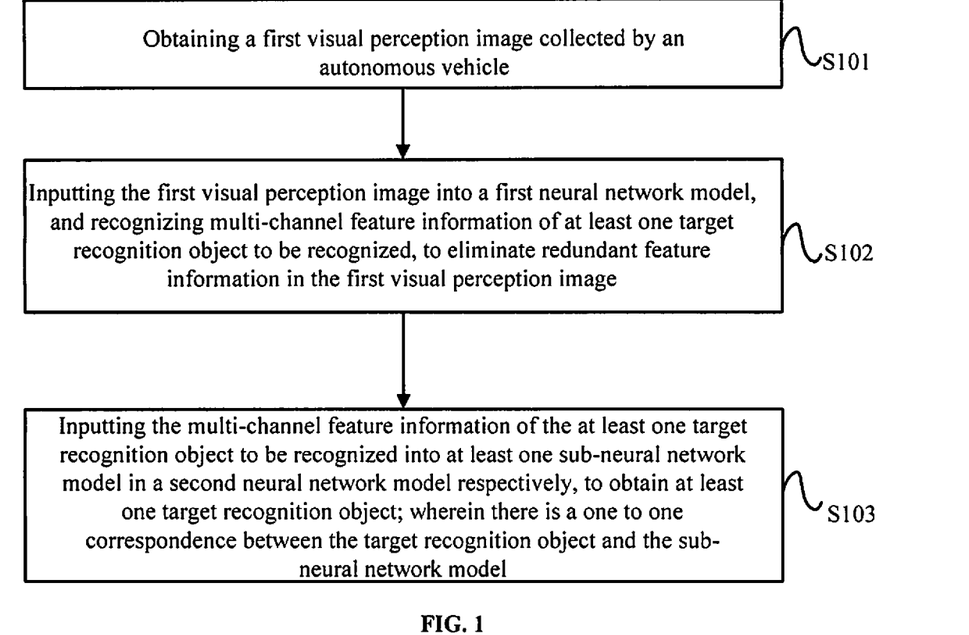
FIG. 1 is a schematic flowchart of a visual perception method based on an autonomous vehicle according to an embodiment of the present disclosure.

FIG. 1 is a schematic flowchart of a visual perception method based on an autonomous vehicle according to an embodiment of the present disclosure. As shown in FIG. 1, the visual perception method based on the autonomous vehicle provided in this embodiment may include:

Step S101: obtaining a first visual perception image collected by the autonomous vehicle.

In this step, a visual perception apparatus based on the autonomous vehicle obtains the first visual perception image (image information indicating the surrounding environment of the autonomous vehicle) collected by the autonomous vehicle.

Optionally, the visual perception apparatus based on the autonomous vehicle may obtain the first visual perception image collected by an image collection apparatus in the autonomous vehicle. Illustratively, the image collection apparatus may include, but not limited to, at least one of the followings: a camera and a laser detector.

Of course, the visual perception apparatus based on the autonomous vehicle may also obtain the first visual perception image collected by the autonomous vehicle in other ways, which is not limited in embodiments of the present disclosure.

Step S102: inputting the first visual perception image into a first neural network model, and recognizing multi-channel feature information of at least one target recognition object to be recognized, to eliminate redundant feature information in the first visual perception image.

In this step, the visual perception apparatus based on the autonomous vehicle inputs the first visual perception image into the first neural network model, and the first neural network model extracts features of the first visual perceptual image, thereby the multi-channel feature information of the at least one target recognition object to be recognized in the first visual perceptual image is recognized, so as to eliminate the redundant feature information (referring to feature information that does not need to be recognized) in the first visual perception image, which facilitates the multi-channel feature information of the at least one target recognition object can be directly and quickly recognized by a second neural network model.

Step S103: inputting the multi-channel feature information of the at least one target recognition object to be recognized into at least one sub-neural network model in a second neural network model respectively, to obtain at least one target recognition object; wherein there is a one to one correspondence between the target recognition object and the sub-neural network model.

In embodiments of the present disclosure, the second neural network model may include at least one sub-neural network model in parallel, and each sub-neural network model corresponds to one class of target recognition object. Illustratively, any one of the sub-neural network models in the second neural network model is configured to recognize multi-channel feature information of a corresponding target recognition object to obtain the target recognition object.

For example, assuming that the second neural network model includes: a sub-neural network model 1, a sub-neural network model 2, and a sub-neural network model 3; where the sub-neural neural network model 1 is configured to recognize multi-channel feature information of a target recognition object A to obtain the target recognition object A; the sub-neural neural network model 2 is configured to recognize multi-channel feature information of a target recognition object B to obtain the target recognition object B; the sub-neural neural network model 3 is configured to recognize multi-channel feature information of a target recognition object C to obtain the target recognition object C.

In this step, the visual perception apparatus based on the autonomous vehicle inputs the multi-channel feature information of the at least one target recognition object to be recognized, obtained by the first neural network model eliminating the redundant feature information in the first visual perception image, into corresponding sub-neural network models in the second neural network model respectively, and the corresponding sub-neural network model recognizes the multi-channel feature information of corresponding target recognition object to obtain the corresponding target recognition object, so as to facilitate control of the autonomous vehicle.

For example, assuming that the at least one target recognition object to be recognized includes a target recognition object A, a target recognition object B, and a target recognition object C, and the second neural network model includes a sub-neural network model 1, a sub-neural network model 2 and a sub-neural network model 3; where the sub-neural network model 1 corresponds to the target recognition object A, the sub-neural network model 2 corresponds to the target recognition object B, and the sub-neural network model 3 corresponds to the target recognition object C.

In this step, 1) the visual perception apparatus based on the autonomous vehicle may inputs multi-channel feature information of the target recognition object A into the sub-neural network model 1 in the second neural network model, the sub-neural network model 1 recognizes the multi-channel feature information of the target recognition object A to obtain the target recognition object A.

2) the visual perception apparatus based on the autonomous vehicle may inputs multi-channel feature information of the target recognition object B into the sub-neural network model 2 in the second neural network model, the sub-neural network model 2 recognizes the multi-channel feature information of the target recognition object B to obtain the target recognition object B.

3) the visual perception apparatus based on the autonomous vehicle may inputs multi-channel feature information of the target recognition object C into the sub-neural network model 3 in the second neural network model, the sub-neural network model 3 recognizes the multi-channel feature information of the target recognition object C to obtain the target recognition object C.

It should be noted that, in embodiments of the present disclosure, the steps that the visual perception apparatus based on the autonomous vehicle inputs the multi-channel feature information of the target recognition object A into the sub-neural network model 1 in the second neural network model for recognition, the visual perception apparatus based on the autonomous vehicle inputs the multi-channel feature information of the target recognition object B into the sub-neural network model 2 in the second neural network model for recognition, and the visual perception apparatus based on the autonomous vehicle inputs the multi-channel feature information of the target recognition object C into the sub-neural network model 3 in the second neural network model for recognition, may be performed in parallel or sequentially, which are not limited in embodiments of the present disclosure.

The visual perception methods based on an autonomous vehicle provided in the embodiments of the present disclosure are performed by inputting an obtained first visual perception image collected by the autonomous vehicle into a first neural network model, recognizing multi-channel feature information of at least one target recognition object to be recognized to eliminate redundant feature information in the first visual perception image; further, inputting the multi-channel feature information of the at least one target recognition object to be recognized into at least one sub-neural network model in a second neural network model respectively to obtain at least one target recognition object; where there is a one to one correspondence between the target recognition object and the sub-neural network model. In embodiments of the present disclosure, eliminating the redundant feature information in the first visual perception image through the first neural network model, and only inputting the multi-channel feature information of the at least one target recognition object to be recognized into the at least one sub-neural network model in the second neural network model respectively for recognition may reduce the time for each sub-neural network model to eliminate redundant feature information, increase the speed of recognizing the target recognition object, thereby improving sensitivity of the autonomous vehicle, and ensuring the driving safety of the autonomous vehicle.

Figure 2:
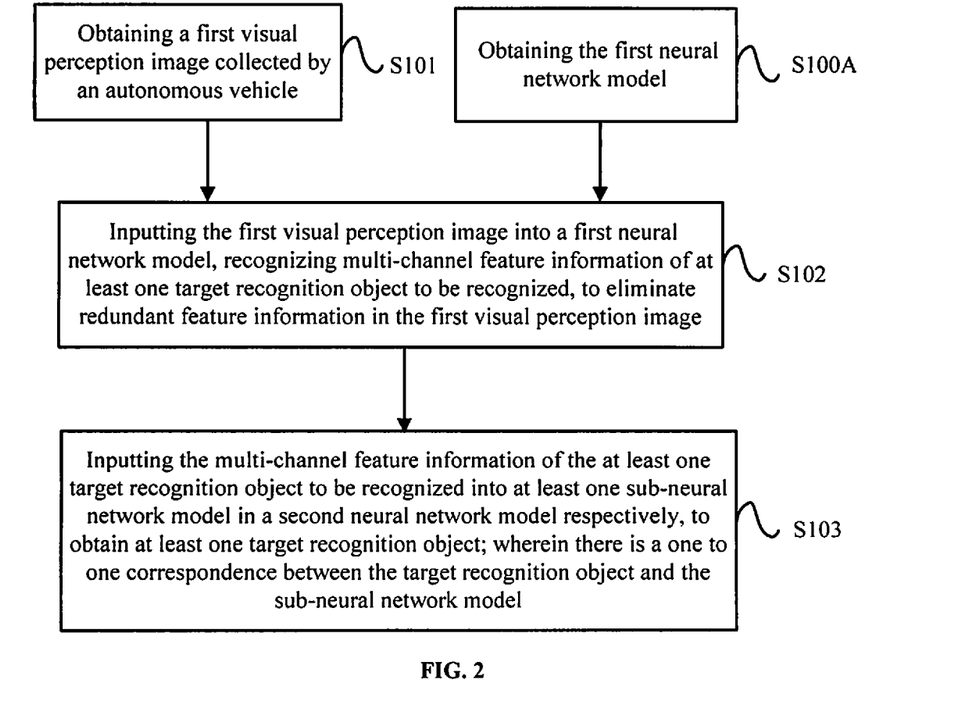
FIG. 2 is a schematic flowchart of a visual perception method based on an autonomous vehicle according to another embodiment of the present disclosure.

FIG. 2 is a schematic flowchart of a visual perception method based on an autonomous vehicle according to another embodiment of the present disclosure. On the basis of the foregoing embodiments, as shown in FIG. 2, before the step S102 in embodiments of the present disclosure, the method further includes:

S100A: obtaining the first neural network model.

In this step, the visual perception apparatus based on the autonomous vehicle needs to obtain the first neural network model, so that the visual perception apparatus based on the autonomous vehicle may use the first neural network model to extract features of the first visual perception image, thereby recognizing the multi-channel feature information of the at least one target recognition object to be recognized, and eliminating the redundant feature information in the first visual perception image.

The following part of embodiments of the present disclosure introduces a specific implementation manner of the above step S100A.

Illustratively, a first preset neural network model is trained according to a second visual perception image and multi-channel feature information of at least one training sample object, to generate the first neural network model wherein the second visual perception image comprises at least one training sample object.

In embodiments of the present disclosure, the visual perception apparatus based on the autonomous vehicle trains the first preset neural network model according to the second visual perception image (including the at least one training sample object) until multi-channel feature information obtained by the training is similar to or same as the multi-channel feature information of the at least one training sample object (for example, a proportion of the same information is greater than a first predetermined proportion), thereby obtaining the first neural network model.

Of course, in embodiments of the present disclosure, the first neural network model may be obtained by other ways, which is not limited in embodiments of the present disclosure.

In embodiments of the present disclosure, obtaining the first neural network model so as to eliminate the redundant feature information in the first visual perception image according to the first neural network model, and only inputting the multi-channel feature information of the at least one target recognition object to be recognized into the at least one sub-neural network model in the second neural network model respectively for recognition, which may reduce time for each sub-neural network model to eliminate the redundant feature information, improve the speed of recognizing the target recognition object, thereby improving sensitivity of the autonomous vehicle, and ensuring driving safety of the autonomous vehicle.

Figure 3:
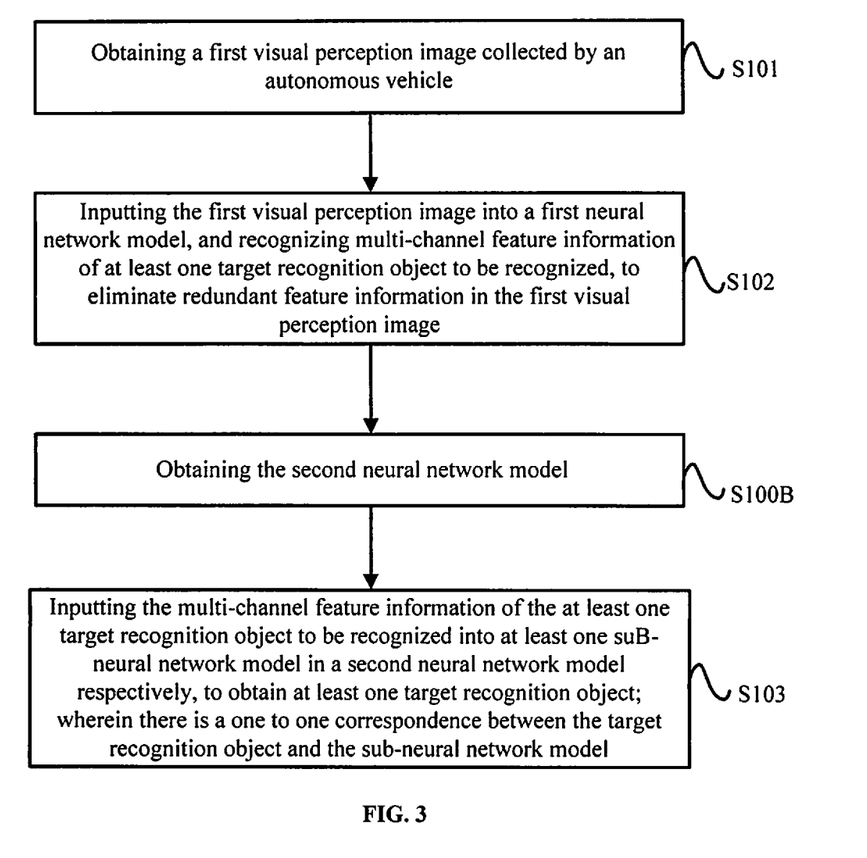
FIG. 3 is a schematic flowchart of a visual perception method based on an autonomous vehicle according to another embodiment of the present disclosure.

FIG. 3 is a schematic flowchart of a visual perception method based on an autonomous vehicle provided in another embodiment of the present disclosure. On the basis of the foregoing embodiments, as shown in FIG. 3, before the step S103 in embodiments of the present disclosure, the method further includes:

Step S100B: obtaining the second neural network model.

In embodiments of the present disclosure, the second neural network model may include at least one sub-neural network model in parallel, and each sub-neural network model corresponds to a class of target recognition object. Exemplarily, any one of the sub-neural network models in the second neural network model is configured to recognize multi-channel feature information of a corresponding target recognition object to obtain the target recognition object.

In this step, the visual perception apparatus based on the autonomous vehicle needs to obtain the second neural network model, so that the visual perception apparatus based on the autonomous vehicle in the subsequent step inputs the multi-channel feature information of the at least one target recognition object to be recognized into the at least one sub-neural network model in the second neural network model respectively to obtain at least one target recognition object.

The following part of the embodiments of the present disclosure introduces a specific implementation manner of the above step S100B.

Illustratively, at least one sub-preset neural network model in a second preset neural network model is trained according to at least one training sample object and multi-channel feature information of the at least one training sample object to generate the second neural network model; where there is a one to one correspondence between the training sample object and the sub-preset neural network model.

The second preset neural network model involved in embodiments of the present disclosure includes at least one sub-preset neural network model in parallel, and each sub-preset neural network model corresponds to a class of training sample object. Exemplarily, any one of the sub-preset neural network models in the second preset neural network model is configured to recognize multi-channel feature information of a corresponding training sample object.

In embodiments of the present disclosure, the visual perception apparatus based on the autonomous vehicle trains corresponding sub-preset neural network models in the second preset neural network model respectively according to the multi-channel feature information of the at least one training sample object until an object obtained by the training is similar to or same as the at least one training sample object (for example, a proportion of the same information is greater than a second predetermined proportion), thereby obtaining the second neural network model.

For example, assuming that the at least one training sample object includes a training sample object A, a training sample object B, and a training sample object C, and the second preset neural network model includes a sub-preset neural network model 1, a sub-preset a neural network model 2 and a sub-preset neural network model 3; where the sub-preset neural network model 1 corresponds to the training sample object A, and the sub-predetermined neural network model 2 corresponds to the training sample object B, and the pre-preset neural network model 3 corresponds to the training sample object C.

In embodiments, 1) the visual perception apparatus based on the autonomous vehicle trains the sub-preset neural network model 1 in the second preset neural network model according to the multi-channel feature information of the training sample object A until an object obtained by the training is similar to or same as the training sample object A (for example, a proportion of the same information is greater than the second predetermined proportion), and the sub-preset neural network model 1 is obtained.

2) the visual perception apparatus based on the autonomous vehicle trains the sub-preset neural network model 2 in the second preset neural network model according to the multi-channel feature information of the training sample object B until an object obtained by the training is similar to or same as the training sample object B (for example, a proportion of the same information is greater than the second predetermined proportion), and the sub-preset neural network model 2 is obtained.

3) the visual perception apparatus based on the autonomous vehicle trains the sub-preset neural network model 3 in the second preset neural network model according to the multi-channel feature information of the training sample object C until an object obtained by the training is similar to or same as the training sample object C (for example, a proportion of the same information is greater than the second predetermined proportion), and the sub-preset neural network model 3 is obtained.

The second neural network model therefore is obtained by the above training; exemplarily, the second neural network model includes the sub-preset neural network model 1, the sub-preset neural network model 2, and the sub-preset neural network model 3.

It should be noted that, in embodiments of the present disclosure, the steps that the visual perception apparatus based on the autonomous vehicle trains the sub-preset neural network model 1 of the second preset neural network model according to the multi-channel feature information of the training sample object A, the visual perception apparatus based on the autonomous vehicle trains the sub-preset neural network model 2 of the second preset neural network model according to the multi-channel feature information of the training sample object B, and the visual perception apparatus based on the autonomous vehicle trains the sub-preset neural network model 3 of the second preset neural network model according to the multi-channel feature information of the training sample object C may be performed in parallel or sequentially, which are not limited in embodiments of the present disclosure.

Of course, in embodiments of the present disclosure, the second neural network model may be obtained by other ways, which is not limited in embodiments of the present disclosure.

It should be noted that step S100B is schematically set between step S102 and step S103 in FIG. 3, but it is not limited that step S100B must be performed after step S101 and/or step S102, FIG. 3 only schematically shows step S100B is set before step S103, and execution sequence of step S101, step S102 and step S100B is not limited.

The visual perception methods based on an autonomous vehicle provided in the embodiments of the present disclosure are performed by obtaining the second neural network model, so as to directly recognize multi-channel feature information of corresponding target recognition object according to the at least one sub-neural network model in the second neural network model, without needing to eliminate redundant feature information separately, which improves the speed of recognizing the target recognition object, thereby improving sensitivity of the autonomous vehicle and ensuring driving safety of the autonomous vehicle.

Figure 4:
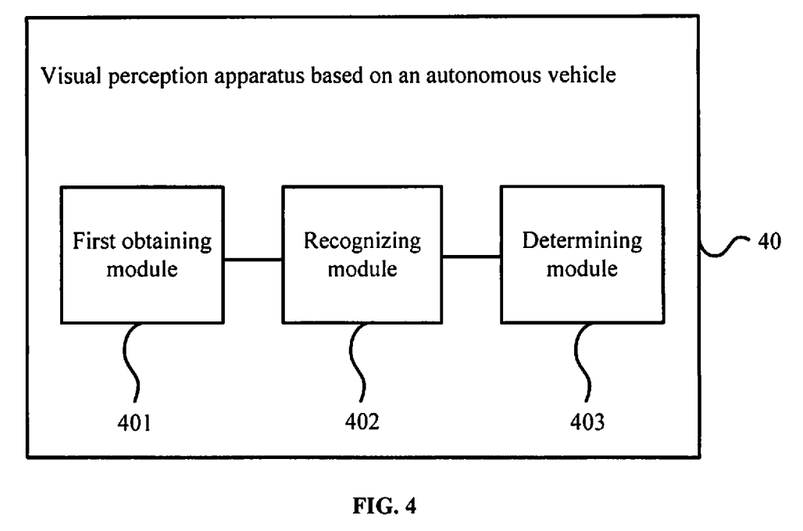
FIG. 4 is a schematic structural diagram of a visual perception apparatus based on an autonomous vehicle according to an embodiment of the present disclosure.

FIG. 4 is a schematic structural diagram of a visual perception apparatus based on an autonomous vehicle provided in an embodiment of the present disclosure. As shown in FIG. 4, the visual perception apparatus based on the autonomous vehicle 40 according to the embodiment of the present disclosure may include a first obtaining module 401, an recognizing module 402, and a determining module 403.

Wherein, the first obtaining module 401 is configured to obtain a first visual perception image collected by the autonomous vehicle;

the recognizing module 402 is configured to input the first visual perception image into a first neural network model, and recognize multi-channel feature information of at least one target recognition object to be recognized, so as to eliminate redundant feature information in the first visual perception image; and the determining module 403 is configured to input the multi-channel feature information of the at least one target recognition object to be recognized into at least one sub-neural network model in a second neural network model respectively, to obtain at least one target recognition object;

where there is a one to one correspondence between the target recognition object and the sub-neural network model.

In a possible embodiment, the visual perception apparatus based on the autonomous vehicle further includes:

a second obtaining module, configured to obtain the first neural network model.

In a possible embodiment, the second obtaining module is specifically configured to:

train a first preset neural network model according to a second visual perception image and multi-channel feature information of at least one training sample object, to generate the first neural network model; where the second visual perception image comprises at least one training sample object.

In a possible embodiment, the visual perception apparatus based on the autonomous vehicle further includes:

a third obtaining module, configured to obtain the second neural network model.

In a possible embodiment, the third obtaining module is specifically configured to:

train at least one sub-preset neural network model in a second preset neural network model according to at least one training sample object and multi-channel feature information of the at least one training sample object, to generate the second neural network model; where there is a one to one correspondence between the training sample object and the sub-preset neural network model.

In a possible embodiment, the first obtaining module 401 is specifically configured to:

obtain the first visual perception image collected by an image collection apparatus in the autonomous vehicle.

In a possible embodiment, the target recognition object includes at least one of the followings: a target substance and target semantics.

The visual perception apparatuses based on the autonomous vehicle according to embodiments are used to perform the technical solutions in embodiments of the above visual perception methods based on the autonomous vehicle of the present disclosure, and the technical principles and technical effects thereof are similar, and details are not described herein again.

Figure 5:
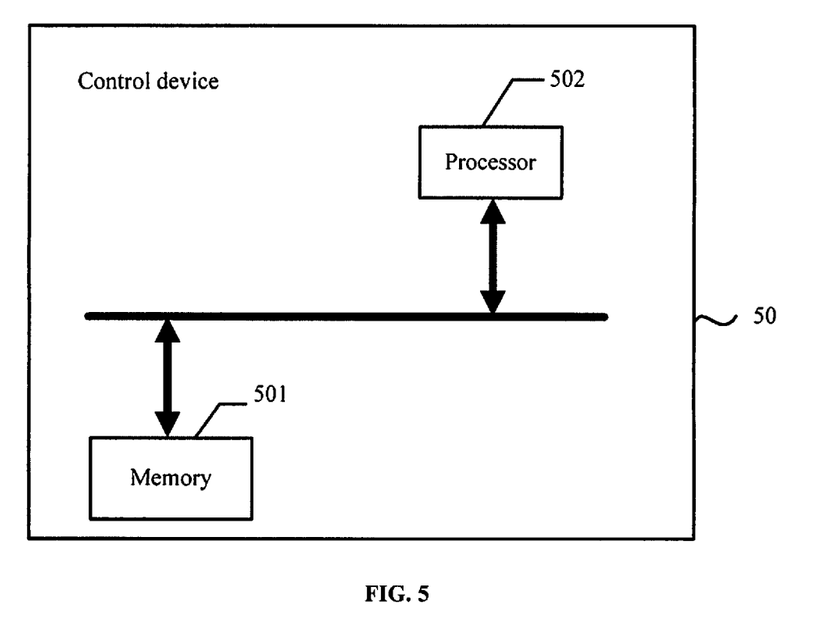
FIG. 5 is a schematic structural diagram of a control device according to an embodiment of the present disclosure.

FIG. 5 is a schematic structural diagram of a control device according to an embodiment of the present disclosure. Illustratively, the control device according to embodiments of the present disclosure may be a controller of an autonomous vehicle or a controller of an autonomous vehicle system or the like. As shown in FIG. 5, a control device 50 according to embodiments of the present disclosure may include a memory 501 and a processor 502;

the memory 501 is configured to store a computer instruction.

The processor 502 is configured to run the computer instruction stored in the memory 501 to implement the technical solutions in embodiments of the visual perception method based on the autonomous vehicle, the technical principles and technical effects thereof are similar, and details are not described herein again.

Embodiments of the present disclosure further provide a storage medium, including a readable storage medium and a computer instruction, where the computer instruction is stored in the readable storage medium the computer instruction is configured to implement the technical solutions in embodiments of the visual perception method based on the autonomous vehicle, the technical principles and technical effects thereof are similar, and details are not described herein again.

Embodiments of the present disclosure further provide a chip for running a command, and the chip is configured to implement the technical solutions in embodiments of the visual perception method based on the autonomous vehicle, the technical principles and technical effects thereof are similar, and details are not described herein again.

Embodiments of the present disclosure further provide a program product, the program product includes a computer program, the computer program is stored in a storage medium, and at least one processor may read the computer program from the storage medium, and the at least one processor, when executes the computer program, may implement the technical solutions in embodiments of the visual perception method based on the autonomous vehicle, the technical principles and technical effects thereof are similar, and details are not described herein again.

The processor 502 may be a central processing unit (CPU), and may be other general-purpose processor, a digital signal processor (DSP), and an disclosure specific integrated circuit (ASIC). The general-purpose processor may be a microprocessor or the processor may be any conventional processor or the like. The steps of the methods disclosed in embodiments of the present disclosure may be directly implemented by a hardware processor, or may be performed by a combination of hardware and software modules in a processor.

Persons of ordinary skill in the art may understand that in various embodiments of the present disclosure, the size of the serial numbers in the above processes does not mean the order of execution, and the order of execution of each process should be determined by its function and internal logic, and should not constitute any limitation to implementation processes of embodiments of the present disclosure.

Persons of ordinary skill in the art may understand that all or a part of the steps of the methods according to embodiments of the present disclosure may be implemented by a program instructing relevant hardware. The program may be stored in a computer readable storage medium. When the program runs, the steps of the methods according to the embodiments are performed. The foregoing storage medium includes various media that may store program codes, such as a ROM, a RAM, a magnetic disk, or an optical disk.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they ay still make modifications to the technical solutions described in the foregoing embodiments or make equivalent substitutions to some or all technical features thereof, without departing from the scope of the technical solutions of embodiments of the present disclosure.

What is claimed is:

1. A visual perception method based on an autonomous vehicle, comprising:

obtaining a first visual perception image collected by the autonomous vehicle;

inputting the first visual perception image into a first neural network model, and recognizing multi-channel feature information of at least one target recognition object to be recognized, to eliminate redundant feature information in the first visual perception image; and inputting the multi-channel feature information of each of the at least one target recognition object to be recognized into a corresponding sub-neural network model of multiple sub-neural network models in a second neural network model, to obtain the at least one target recognition object; wherein each of the multiple sub-neural network models corresponds to a class of target recognition object.

2. The method according to claim 1, wherein the method further comprises:
obtaining the first neural network model.

3. The method according to claim 2, wherein the obtaining the first neural network model comprises:
training a first preset neural network model according to a second visual perception image and multi-channel feature information of at least one training sample object, to generate the first neural network model; wherein the second visual perception image comprises the at least one training sample object.

4. The method according to claim 1, further comprises:
obtaining the second neural network model.

5. The method according to claim 4, wherein the obtaining the second neural network model comprises:
training multiple sub-preset neural network models in a second preset neural network model according to at least one training sample object and multi-channel feature information of the at least one training sample object, to generate the second neural network model; wherein each of the multiple sub-preset neural network models corresponds to a class of training sample object.

6. The method according to claim 1, wherein the obtaining the first visual perception image collected by the autonomous vehicle comprises:
obtaining the first visual perception image collected by an image collection apparatus in the autonomous vehicle.

7. The method according to claim 1, wherein the target recognition object comprises at least one of the followings: a target substance and target semantics.

8. A visual perception apparatus based on an autonomous vehicle, comprising:
a processor; and
a computer-readable medium for storing program codes, which, when executed by the processor, the processor is caused to:
obtain a first visual perception image collected by the autonomous vehicle;
input the first visual perception image into a first neural network model, and recognize multi-channel feature information of at least one target recognition object to be recognized, to eliminate redundant feature information in the first visual perception image; and
input the multi-channel feature information of each of the at least one target recognition object to be recognized into a corresponding sub-neural network model of multiple sub-neural network models in a second neural network model, to obtain at least one target recognition object; wherein each of the multiple sub-neural network models corresponds to a class of target recognition object.

9. The apparatus according to claim 8, wherein the processor is further caused to:
obtain the first neural network model.

10. The apparatus according to claim 9, wherein the processor is further caused to:
train a first preset neural network model according to a second visual perception image and multi-channel feature information of at least one training sample object, to generate the first neural network model; wherein the second visual perception image comprises the at least one training sample object.

11. The apparatus according to claim 8, wherein the processor is further caused to:
obtain the second neural network model.

12. The apparatus according to claim 11, wherein the processor is further caused to:
train multiple sub-preset neural network models in a second preset neural network model according to at least one training sample object and multi-channel feature information of the at least one training sample object, to generate the second neural network model; wherein each of the multiple sub-preset neural network models corresponds to a class of training sample object.

13. The apparatus according to claim 8, wherein the processor is further caused to:
obtain the first visual perception image collected by an image collection apparatus in the autonomous vehicle.

14. The apparatus according to claim 8, wherein the target recognition object comprises at least one of the followings: a target substance and target semantics.

15. A non-transitory storage medium, comprising a non-transitory readable storage medium and a computer instruction, the computer instruction is stored in the readable storage medium; the computer instruction is configured to implement a visual perception method comprising the steps of:
obtaining a first visual perception image collected by the autonomous vehicle;
inputting the first visual perception image into a first neural network model, and recognizing multi-channel feature information of at least one target recognition object to be recognized, to eliminate redundant feature information in the first visual perception image; and
inputting the multi-channel feature information of each of the at least one target recognition object to be recognized into a corresponding sub-neural network model of multiple sub-neural network models in a second neural network model, to obtain the at least one target recognition object; wherein each of the multiple sub-neural network models corresponds to a class of target recognition object.

* * * * *